(12) United States Patent
Bono et al.

(10) Patent No.: US 9,358,534 B2
(45) Date of Patent: Jun. 7, 2016

(54) CATALYST, CATALYTIC CONVERTER, AND METHOD FOR THE PRODUCTION THEREOF

(75) Inventors: Michael S. Bono, Clifton Park, NY (US); Nicholas J. H. Dunn, Bangor, ME (US); Lauren B. Brown, Gloversville, NY (US); Stephen J. Juhl, Collinsville, CT (US); Ann M. Anderson, Scotia, NY (US); Bradford A. Bruno, Delanson, NY (US); Mary K. Mahony, Schenectady, NY (US)

(73) Assignee: Union College, Schenectady, NY (US)

( * ) Notice: Subject to any disclaimer, the term of this patent is extended or adjusted under 35 U.S.C. 154(b) by 434 days.

(21) Appl. No.: 13/304,753

(22) Filed: Nov. 28, 2011

(65) Prior Publication Data

US 2013/0136664 A1 May 30, 2013

(51) Int. Cl.

| | |
|---|---|
| *B01D 53/94* | (2006.01) |
| *B01J 35/00* | (2006.01) |
| *B01J 23/72* | (2006.01) |
| *B01J 23/755* | (2006.01) |
| *B01J 37/03* | (2006.01) |
| *B01J 37/02* | (2006.01) |
| *B01J 35/04* | (2006.01) |
| *B01J 35/10* | (2006.01) |
| *B01J 37/00* | (2006.01) |
| *B01J 21/04* | (2006.01) |
| *B01J 21/06* | (2006.01) |
| *B01J 21/08* | (2006.01) |

(52) U.S. Cl.
CPC ............ *B01J 35/002* (2013.01); *B01D 53/945* (2013.01); *B01J 23/72* (2013.01); *B01J 23/755* (2013.01); *B01J 35/0026* (2013.01); *B01J 35/04* (2013.01); *B01J 35/1019* (2013.01); *B01J 35/1023* (2013.01); *B01J 35/1061* (2013.01); *B01J 37/0009* (2013.01); *B01J 37/0205* (2013.01); *B01J 37/033* (2013.01); *B01J 37/036* (2013.01); *B01D 2255/2092* (2013.01); *B01D 2255/20707* (2013.01); *B01D 2255/20753* (2013.01); *B01D 2255/20761* (2013.01); *B01D 2255/30* (2013.01); *B01D 2255/65* (2013.01); *B01J 21/04* (2013.01); *B01J 21/063* (2013.01); *B01J 21/08* (2013.01); *Y02T 10/22* (2013.01)

(58) Field of Classification Search
None
See application file for complete search history.

(56) References Cited

U.S. PATENT DOCUMENTS

| | | | |
|---|---|---|---|
| 2003/0180197 A1* | 9/2003 | Nunan | 422/177 |
| 2009/0022633 A1* | 1/2009 | Tomosue et al. | 422/177 |

FOREIGN PATENT DOCUMENTS

JP 0515787 A * 1/1993

OTHER PUBLICATIONS

Osaki et al. NiO—Al2O3 Aerogel from (CH2O)2Ni and AlOOH sol. Journal of Non-Crystalline Solids, 225, 1998, pp. 111-114.*

(Continued)

*Primary Examiner* — Walter D Griffin
*Assistant Examiner* — Jelitza Perez
(74) *Attorney, Agent, or Firm* — Joseph M. Noto; Bond, Schoeneck & King PLLC

(57) ABSTRACT

A catalyst which remediates hydrocarbon fuel combustion exhaust, including a non-PGM containing aerogel which catalyzes the oxidation of carbon monoxide and hydrocarbons and the reduction of nitrogen oxides present in the exhaust, a catalytic converter made therefrom, and a method for the production thereof is disclosed.

22 Claims, 7 Drawing Sheets

(56) References Cited

OTHER PUBLICATIONS

Montserrat Dominguez et al., "Co—SiO2 aerogel-coated catalytic walls for the generation of hydrogen", Catalyst Today, vol. 138, 2008, pp. 193-197.

Won-Il Kim et al., "Photocatalytic degraadation of methanol on titania and titania-silica aerogels prepared by nonalkoxide sol-gel route", Topics in Catalysis, vol. 44, No. 4, Jul. 2007, pp. 499-505.

Michael S. Bono et al., "Alumina aerogels prepared via rapid supercritical extraction", Journal of Sol-Gel Science and Technology, vol. 53, Sep. 29, 2009, pp. 216-226.

M.A. Reiche et al., "Vanadia grafted on TiO2—SiO2, TiO2 and SiO2 aerogels Structural properties and catalytic behaviour in selective reduction of NO by NH3", Applied Catalysis, B: Environmental 23, 1999, pp. 187-203.

S. Krompiec et al., "Nickel-alumina composite aerogel catalyst with a high nickel load: a novel fast sol-gel synthesis procedure and screening of catalytic properties", Journal of Non-Crystalline Solids, vol. 315, 2003, pp. 297-303.

L. Owens et al., "Characterization of vanadium/silica and copper/silica aerogel catalysts", Journal of Non-Crystalline Solids, vol. 186, 1995, pp. 177-183.

PCT International Search Report; PCT/US2012/054729 mailed Jan. 9, 2013.

PCT Written Opinion of the International Searching Authority; PCT/US2012/054729 mailed Jan. 9, 2013.

\* cited by examiner

CATALYST, CATALYTIC CONVERTER, AND METHOD FOR THE PRODUCTION THEREOF

STATEMENT OF GOVERNMENT SPONSORSHIP

The present invention was made with funding received from the National Science Foundation under grant CHE-0847901. The U.S. government has certain rights in the invention.

FIELD

The present disclosure relates to a catalyst and catalytic converter and in particular, non-PGM containing aerogel catalyst and catalytic converter containing such catalyst for remediation of hydrocarbon fuel combustion exhaust and method for the production thereof.

BACKGROUND

In the U.S., a significant portion of air pollution is caused by "mobile sources", which include passenger cars, heavy duty vehicles, and motorcycles. Pollution caused by vehicles is the product of the combustion of hydrocarbon fuels (e.g. gasoline) to release the energy required to propel them. In ideal combustion, oxygen in the air would combine with all the hydrocarbons in gasoline to create only carbon dioxide and water as products.

This ideal combustion, however, never occurs. In reality, the combustion process generates other products, primarily carbon monoxide, various nitrogen oxides, collectively known as $NO_x$, and unburned hydrocarbons (UHC). Carbon monoxide is a deadly, odorless, colorless, poisonous gas. Unburned hydrocarbons and nitrogen oxides are major causes of ground level ozone and smog in urban areas, both of which can cause breathing difficulties and lung damage. To reduce the emission of these pollutants, the U.S. Environmental Protection Agency (EPA) has regulated automotive emissions since its creation in 1970. The EPA dictates how much pollution automobiles and other mobile sources may emit, but manufacturing companies are free to choose how to achieve these limits. In practice this has led to catalytic converters being required for all cars sold and registered in the U.S.

The purpose of a catalytic converter is to remove harmful species from the exhaust stream by reacting them with other exhaust components to form more benign species. Important reactions performed include the reduction of $NO_x$, which would otherwise contribute to the formation of photo-chemical smog and acid rain, the conversion of CO to $CO_2$ and the catalytic combustion of unspent hydrocarbons that make it into the exhaust stream. Ideally, the treated exhaust contains only $CO_2$, $N_2$ and $H_2O$ after passing over the converter.

Currently "three-way catalysts" are the main technology used to control emissions from gasoline internal combustion engines. Three-way catalysts use a metallic or ceramic substrate to support a thin active coating typically incorporating alumina and combinations of the platinum group metals (PGMs), defined as platinum, palladium, and rhodium. Three-way catalysts oxidize hydrocarbons into carbon dioxide and water, carbon monoxide into carbon dioxide, and reduce nitrogen oxides into nitrogen and oxygen. The design parameters of a three-way catalyst can be adjusted to meet the required level of pollutant conversion associated with an application or regulation.

Catalytic converters are more effective at higher temperatures. Between 60% and 80% of all emissions emitted during the U.S. Federal Testing Protocol (FTP) occur during the first few minutes of operation, before the catalytic converter reaches its operating temperature (typically about 300° C. or more). To reach its operating temperature faster, the catalytic converter can be placed closer to the engine so it is exposed to higher temperatures more quickly after engine at startup. The noble metal catalyst in a three way catalyst is usually supported by a layer of γ-alumina due to its high surface area. However, at above 1050° C., γ-alumina can transform to α-alumina, which has a much lower surface area.

Despite their effectiveness in reducing emissions, the need to use PGMs as catalysts makes the production of three-way catalysts harmful to the environment. The use of these metals is the main drawback to the current catalytic converter design; the mining and processing of PGMs is damaging to the environment, which partially offsets the environmental benefits of using a converter. In order to extract one ounce of platinum, over seven tons of ore need to be processed. It is estimated that in South Africa, the world's largest platinum producer, up to 11 kg of coal are burned to extract enough platinum for one catalytic converter, which releases significant amounts of sulfur dioxide and carbon dioxide into the atmosphere. While PGM-based three-way catalysts are extremely effective in reducing emissions locally, when their life cycle is assessed and their global impact considered the result is less than stellar.

Apart from environmental considerations, there is a significant economic impact in using precious metals as catalysts. For example, platinum costs more than $1500 per ounce (circa 2011) and as much as half an ounce is needed for a typical automotive catalytic converter. The cost associated with these metals makes catalytic converters quite expensive relative to other components of the vehicle, which represents a significant added cost to car manufacturers.

Thus, it is desirable to provide a catalyst and a catalytic converter which reduces or eliminates the need for precious metals. It is also desirable to provide catalytic converter technology which can achieve "light off" temperature more quickly and/or can survive operation at higher temperatures. It is further desirable to provide a catalytic converter utilizing a catalyst which would cause considerably less environmental damage as well as provide a more cost effective alternative.

SUMMARY

One aspect of the present invention provides a catalyst which remediates hydrocarbon fuel combustion exhaust, including a non-PGM containing aerogel which catalyzes the oxidation of carbon monoxide and hydrocarbons and the reduction of nitrogen oxides present in the exhaust generated from the combustion of hydrocarbon fuel.

Another aspect of the present invention provides a catalytic converter for remediation of hydrocarbon fuel combustion exhaust, including a housing having an exhaust inlet and an exhaust outlet, a catalyst support disposed in the housing, and a catalyst loaded onto the support, wherein the catalyst includes a non-PGM containing aerogel which catalyzes the oxidation of carbon monoxide and hydrocarbons and the reduction of nitrogen oxides present in the exhaust generated from the combustion of hydrocarbon fuel entering the housing inlet, passing over the catalyst and exiting the housing outlet of the catalytic converter.

Another aspect of the present invention provides a method for making a non-PGM containing aerogel catalyst on a support including submerging a support material in a sol gel precursor chemical solution, allowing the solution to gel around and cover the support material, and processing the gel-covered support material by the UCRSCE technique.

BRIEF DESCRIPTION OF THE DRAWINGS

These and other aspects of the present invention will become apparent upon a review of the following detailed description, drawings, and the claims appended thereto, wherein:

DETAILED DESCRIPTION

Figure 1:
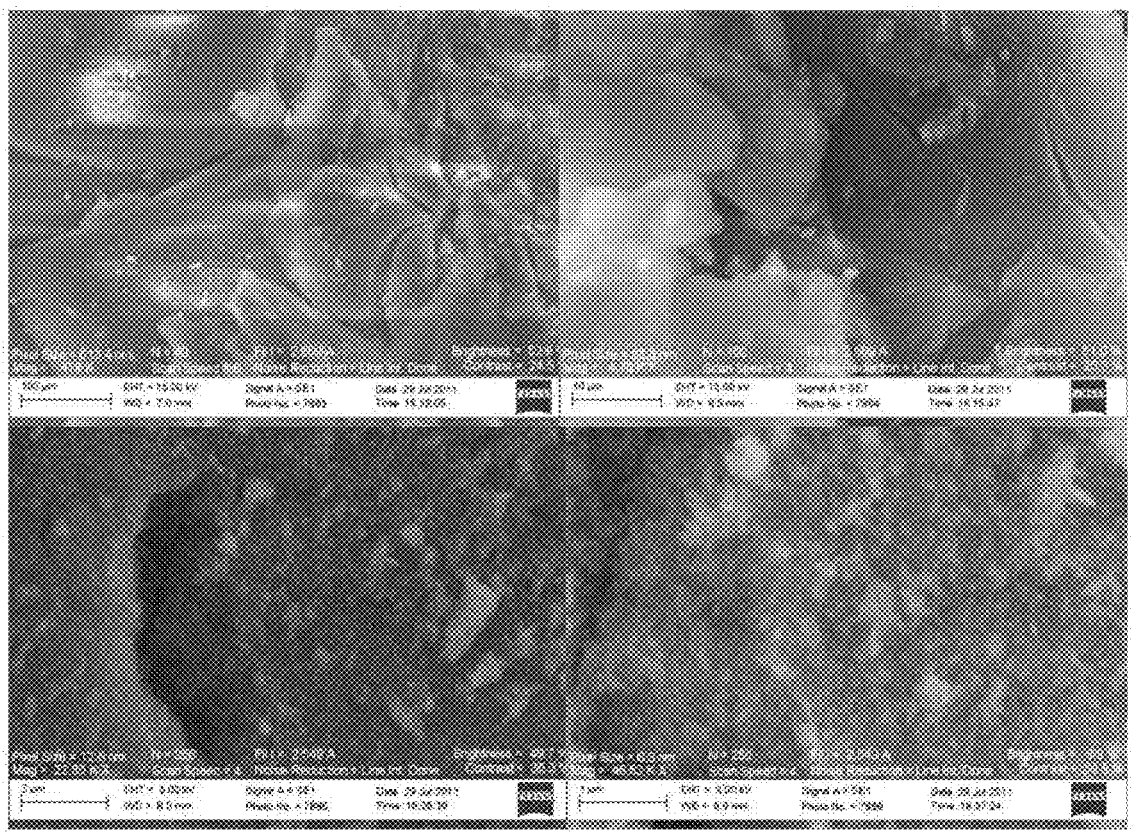
FIG. 1 is a collection of four SEM images of nickel-alumina aerogel recipe 2NImp1-2E-4.

Aerogels of the present invention have low thermal and electrical conductivities in addition to high thermal stability and tunable chemical composition, and are highly porous. They are low-density, high surface area solids that are composed of 90-99% air by volume. These properties lend them to several different applications in catalysis of a wide variety of gas phase reactions.

Aerogels were first discovered in the early 1930's by Kistler (*J. Phys. Chem.* 63:52 (1932)). These first aerogels were composed of thoria and were prepared from aqueous thorium nitrate and ammonia. This synthesis took at least eleven days to yield a small amount of thoria aerogel due to the multiple lengthy solvent exchanges required before supercritical extraction of an alcohol solvent in an autoclave.

The aerogels of the present invention can be prepared by conventional methods for preparing aerogels. Typically aerogels are prepared by synthesizing the porous network in solution, creating what is known as a sol gel. The solvent is then removed from the pores of the sol-gel matrix to yield an aerogel. Care must be taken to avoid capillary forces caused by the evaporation of the solvent, which will collapse the porous network of the sol gel. If these forces are not avoided, the result is a material known as a xerogel, which is approximately 60% air by volume. One method for maintaining the porosity present in the sol gel while removing the solvent is to circumvent the solvent's phrase transition from liquid to gas in a process known as supercritical extraction. In conventional low temperature supercritical extraction methods, the sol gel undergoes a series of solvent exchanges until it is suspended in liquid $CO_2$, at which point it can undergo supercritical extraction by applying sufficient heat and pressure to bypass the liquidus line of $CO_2$. Kistler used an analogous method of supercritical extraction, high temperature supercritical extraction, for his thoria aerogels, utilizing an alcohol as the solvent to be extracted rather than $CO_2$.

Preferably, aerogels of the present invention are prepared in accordance with Union College's patented Rapid Supercritical Extraction (UCRSCE) technique found in U.S. Pat. No. 7,384,988, to Gauthier et al., which is herein incorporated by reference in its entirety. The UCRSCE method for supercritical extraction of aerogels from their reaction solvent utilizes a hydraulic hot press. When compared to traditional supercritical extraction methods, the UCRSCE method has reduced the time required and the solvent waste generated during the solvent exchange. The UCRSCE method is typically performed by mixing the sol-gel precursors in solution and pouring them into a steel mold. The mold is then sealed into the hot press using graphite and a Kapton or stainless steel foil to ensure a complete seal and heated slowly to allow the precursor solution to gel. The temperature continues to increase, in turn increasing the pressure within the cells of the mold until the critical point of the solvent is exceeded. The hot press then reduces the restraining force on the mold to allow the supercritical solvent to vent, cools to room temperature and opens. This method can yield monolithic aerogels in less than a day and without producing a large amount of solvent waste from exchanges.

An alternative application of UCRSCE is to allow the sol-gel to form before it is placed in the steel mold. Upon placing the sol-gel in the mold, each sample is surrounded by sufficient solvent (an alcohol) to fill the cell, after which point the procedure is identical to the method for producing monoliths. This method produces aerogels in the shape of the sol-gel fragments that are put into the hot press and is useful for the extraction of aerogels that require alteration after the sol-gel matrix has formed. The process takes less than a day from starting materials to aerogel. In practice this UCRSCE method reduces the cost and environmental impact associated with aerogel preparation, making them more attractive for large-scale production.

Aerogels of the present invention have favorable properties, such as high surface area and tunable chemical composition, for catalyzing gas-phase reactions associated with automotive catalytic converter technology. Their preparation carries less negative environmental impact than that caused by the mining and processing of the noble metals for use in noble metal catalysts, particularly when prepared by rapid supercritical extraction techniques. Thanks to the high surface area, aerogels exhibit increased catalytic ability compared to bulk metal oxides. Alumina and nickel-alumina aerogels prepared in accordance with the present invention demonstrate activity in several of the reactions that are performed in conventional catalytic converters. The present aerogels are suitable replacements for the noble metals in automotive catalytic converters. As defined herein, non-PGMs are metals that are not PGMs, i.e., metals that are not platinum, palladium, or rhodium. Non-PGM containing aerogels can be made to act as catalysts with similar activity and specificity to these noble metal catalysts. Thus, they present an attractive alternative to conventional noble metal catalysts based on both financial and environmental concerns.

The present invention relates to a catalyst which remediates hydrocarbon fuel combustion exhaust. The catalyst includes a non-PGM containing aerogel which catalyzes the oxidation of carbon monoxide and hydrocarbons and the reduction of nitrogen oxides present in the exhaust generated from the combustion of hydrocarbon fuel. Suitable metals in the non-PGM containing aerogel include Period 4 transition metals, Group 13 (formerly IIIa) elements, and Group 14 (formerly IVa) elements from the Periodic Table of the Elements. The non-PGM can include a combination of at least two different non-PGMs from the Periodic Table of the Elements, at least one of which provides catalytic activity. Preferred non-PGM containing aerogel catalysts include titania, titania-silica, alumina, nickel oxide, nickel-alumina, and copper-alumina. Preferably, the aerogel is formed using supercritical extraction techniques, and more preferably, using UCRSCE techniques. Alumina aerogel catalyst prepared in accordance with the present invention converts NO to $N_2$. Nickel-alumina aerogel catalyst prepared in accordance with the present invention performs as a three-way catalyst simultaneously converting CO to $CO_2$, NO to $N_2$, and oxidizing hydrocarbons.

In one embodiment, the aerogel catalyst includes a non-PGM, preferably a Period 4 transition metal element from the Periodic Table of the Elements, incorporated into a backbone. The backbone can be catalytically active or can be a metal oxide that does not itself show activity as a three-way catalyst but has appropriate physical properties for the application and into which a catalytically active metal can be readily incorporated. The aerogel backbone can incorporate the following: silica, titania, alumina, and combinations thereof. Composite aerogels that include silica, titania and/or alumina have physical properties such as high surface area, low density and structural characteristics that render them attractive for applications in catalysis. Preferably, the aerogel is in a monolithic, powder, particle, film, washcoat or slurry form.

In another embodiment, the aerogel catalyst is loaded on a support, such as a support for use in a catalytic converter. The support is preferably a honeycomb, bead, plate, or foil structure. The honeycomb support is preferably made of cordierite or metal. In loading a catalytic converter support, layers of aerogel material can be deposited inside cordierite channels using a dip-coating method without treating or modifying the surface of the cordierite. Further, the catalyst can be applied to the support in washcoat or slurry form. Cordierite samples that have been dip-coated can be processed in the same way as other aerogel samples, including the use of solvent exchanges and RSCE. The bead support is preferably made of glass, metal, or polymer. The foil and plate support are preferably metal. In another embodiment, the catalyst is prepared by forming a sol-gel around a cordierite honeycomb and the aerogel is formed from the sol-gel using an RSCE process.

In another embodiment, the aerogel catalyst of the present invention is provided in a catalytic converter for remediation of the exhaust generated from the combustion of hydrocarbon fuel. The catalytic converter is composed of a housing having an exhaust inlet and an exhaust outlet for passage of the engine exhaust. A catalyst support is disposed in the housing in the exhaust stream and a non-PGM containing aerogel catalyst is loaded onto the support. In operation, the exhaust generated from the combustion of hydrocarbon fuel entering the housing exhaust inlet passes over the catalyst and exits the housing exhaust outlet of the catalytic converter. As the exhaust passes over the non-PGM containing aerogel catalyst, the catalyst catalyzes the oxidation of carbon monoxide and hydrocarbons and the reduction of nitrogen oxides present in the exhaust.

Alumina-based aerogels of the present invention have high surface areas, as high as 700 $m^2/g$, significantly higher than γ-alumina. Due to their porous nanostructure, alumina-based aerogels also delay the transformation to α-alumina at temperatures up to 1220° C. Thus, a catalytic converter made of an alumina-based aerogel has higher thermal stability than conventional converters, allowing it to be placed closer to the engine so it could reach its working temperature faster, decreasing cold start emissions.

Aerogels from a wide variety of sol-gel precursor chemistries can be prepared by the UCRSCE process. In accordance with the present invention, aerogels successfully fabricated using the UCRSCE process include: silica, hydrophobic silica, titania, titania-silica, alumina, nickel-alumina, nickel oxide and copper-alumina aerogels. The physical properties of aerogels prepared from a variety of precursor recipes and fabricated via the UCRSCE process are comparable to those of aerogels prepared via other processing methods. These properties include bulk and skeletal densities, morphology (by SEM), surface area and porosimetry. Consequently, aerogels prepared from similar precursor recipes but processed via other methods (e.g., $CO_2$ extraction) are expected to show comparable catalytic activity. Moreover, because of the similarities in chemical reactivity of the transition metals, it is to be expected that aerogels prepared using precursors based on other non-PGM transition metals (alone or in combination with other non-PGM transition metals, alumina or silica) would exhibit catalytic activity.

Aerogels can be synthesized by an epoxide-assisted method using propylene oxide as the epoxide and alcohols for solvents. $AlCl_3 \cdot 6H_2O$ (Fisher, >99% purity) is a suitable aluminum source for synthesizing aerogels incorporating aluminum. $Ni(NO_3)_2 \cdot 6H_2O$ (Fisher, >99% purity) is a suitable nickel source for aerogels incorporating nickel. $Cu(NO_3)_2 \cdot 3H_2O$ (Acros Organics, 99%) is a suitable copper source for aerogels incorporating copper. Nickel and copper can be incorporated both directly (during the initial gelation of the sol-gel) and indirectly (during a solvent exchange), as described below. Suitable solvent alcohols include methanol (Fisher, ≥99.8%), ethanol (Fisher, 97% and Pharmco-AAPER, 200 proof) and 2-propanol (Fisher, ≥99.5%). Propylene oxide (Sigma Aldrich, 99%) is a suitable gelation agent.

Titania aerogels can be made from methanol, titanium (IV) butoxide, water and nitric acid. Methanol and titanium (IV) butoxide are mixed together and then added to a mixture of methanol and nitric acid. The solution is stirred and immediately processed using UCRSCE. Resulting titania aerogels are powdery with BET surface areas of 130-180 $m^2/g$, pore volumes near 0.5 $cm^3/g$ and skeletal densities of 3.6 g/mL.

Titania-silica aerogel can be made using an impregnation method or a co-precursor method. The impregnation method involves the fabrication of a silica wet gel which is then impregnated with titania before processing. The silica wet gel is made from a recipe of tetramethyl orthosilicate, water, methanol, and ammonia. The mixture is stirred, poured into a beaker, covered with parafilm and left overnight to gel. On the second day, the parafilm is loosened to allow some shrinkage of the wet gel before removing the gel from the beaker for the subsequent steps. On the third day the silica wet gel is bathed in isopropanol for at least 24 hours. Next the wet gel is bathed in a solution of titanium isopropoxide and acetylacetone for 1-15 days. This is followed by one additional soaking in excess isopropanol for 24 hours before supercritical drying using the UCRSCE method. The co-precursor method uses tetraethyl orthosilicate which is mixed with titanium isopropoxide and then stirred. Next, ethanol, water and hydrochloric acid are added and the mixture is again stirred. Following this water, ethanol and 1.5 M ammonia solution are added. The solution is stirred and aged from 0 to 24 hours at room temperature before being supercritically dried using the UCRSCE method.

The impregnation method of making titania-silica aerogels takes 4-8 days to complete with a 7 hour RSCE and results in translucent monolithic aerogels with high surface area (560-650 $m^2/g$) and high pore volume 2.0-2.6 $cm^3/g$, with bulk densities ranging from 0.1 to 0.4 g/mL and skeletal densities near 2.3 g/mL. The bulk density increases with increased soaking time in titanium isopropoxide. The co-precursor method for preparing titania-silica aerogels takes 8 hours to complete. The resulting aerogels are opaque and less monolithic but have high surface areas (510-580 m$^2$/g), low bulk density (0.03 g/mL) and skeletal densities of 2 g/mL and pore volumes ranging from 1.5-3 cm$^3$/g.

In one embodiment for a sol gel preparation of an alumina aerogel the desired amount of $AlCl_3.6H_2O$ is dissolved solvent-grade ethanol. $AlCl_3.6H_2O$ is not particularly soluble in ethanol, so magnetic stirring and/or sonication is applied until no particulates are visible. Once the precursor salt has dissolved propylene oxide is added to the mixture with mechanical stirring of the solution using a magnetic stir bar. Gelation occurs in fewer than 3 minutes after the addition of the propylene oxide. The sol gel is allowed to set overnight before undergoing a solvent rinse with ethanol. The preparation of sol gels can be performed in water-containing solvents. In another embodiment, a secondary metal besides aluminum can be added through solvent exchange. In another embodiment, all of the metal salts can be added to the precursor solution prior to gelation. The solvent rinse can be preceded by breaking up the sol-gel matrix by gentle agitation with a glass stirring rod in order to facilitate a faster exchange. The reaction solvent is then poured off, and a volume of absolute ethanol is added to the broken sol-gel. The sol gel is allowed to sit overnight in its original beaker covered with parafilm. The entire gelation and rinsing procedure can also be performed in less than a day by utilizing two 2-hour solvent rinses after allowing the sol gel to set for 3 hours. This decrease in processing time has little adverse effect on the properties of the resulting aerogels.

In another embodiment, the sol gels can be prepared with other alcohols, substituting either methanol or 2-propanol for ethanol at every step. Changing the solvent alcohol does not noticeably change the gelation time. When water is incorporated as part of the solvent, a 50/50 (v/v) water/alcohol solution is used to perform the initial gelation reaction, and the alcohol is used for the solvent exchange.

To prepare a nickel-alumina or copper-alumina sol gel by the direct addition method, the amount of $AlCl_3.6H_2O$ is reduced to keep the total number of moles of metal in the solution consistent with that of the alumina recipe. $Ni(NO_3)_2.6H_2O$ or $Cu(NO_3)_2.3H_2O$ is added to the beaker at the same time as the $AlCl_3.6H_2O$, prior to gelation.

To prepare a nickel-alumina or copper-alumina sol gel by solvent impregnation, $Ni(NO_3)_2.6H_2O$ or $Cu(NO_3)_2.3H_2O$ is added to the exchange solvent. Since the addition of these metal salts occurs post-gelation, the amount of $AlCl_3.6H_2O$ used to prepare the sol gel is the same as for an alumina sol gel.

After the alcohol rinse, the sol gel is ready to undergo solvent extraction according to UCRSCE. Preferably, the sol-gel fragments are divided evenly between the cells of a stainless steel mold, with the remaining space in each cell filled with the solvent alcohol. The mold is then placed on a hydraulic hot press and sealed with graphite and a thin sheet of non-stick material to prevent the graphite from sticking to the mold. Stainless steel foil is suitable for this purpose because it displays no reactivity with components of the precursor mixture under supercritical conditions.

In accordance with preferred programs used for UCRSCE on the hot press, 2-propanol has a lower critical temperature (235° C.) than methanol (240° C.) or ethanol (241° C.), and so programs for extracting 2-propanol are able to use a lower maximum temperature. A preferred restraining force is applied at a rate of 890 kN/min and released at a rate of 4.4 kN/min. Due to the fast heating rate in a rapid program, a dwell time of 30 minutes is set after the heating step to allow the contents of the mold to come to thermal equilibrium at the desired temperature.

In one embodiment for the preparation of aerogel-coated cordierite, aerogel layers are mounted onto cordierite matrices by placing pieces of cordierite in the precursor solution and allowing the sol gel to form around them. These samples are subjected to a passive solvent rinse by soaking in absolute ethanol in a beaker covered by parafilm overnight without agitation or stirring. The coated cordierite is then transferred to a cell in the stainless mold to undergo supercritical extraction.

Pore size distributions found by the BJH method for RSCE alumina and nickel-alumina aerogels are similar to those seen in the literature, concentrated in the 10-100 nm range, indicating the successful preparation of a nanoporous material. The porous nature of aerogels leads to a high surface area within the materials, up to 2240 m$^2$/g in some cases for doped carbon aerogels. Surface areas of 600-800 m$^2$/g are considered high for alumina aerogels, and the addition of nickel decreases the expected surface area to 400-600 m$^2$/g. Given this high specific surface area along with high thermal stability and tunable chemical composition, the present aerogels perform well as heterogeneous catalysts for gas-phase reactions. These heterogeneous systems benefit greatly from a high surface area on the catalyst which increases the number of exposed active sites for reaction, thereby increasing the efficiency of the reaction with respect to the gas flow.

The surface areas and bulk densities of UCRSCE alumina and nickel-alumina aerogels prepared in accordance with the present invention are within the range of values seen in the literature, with differences arising from composition and extraction conditions. In particular, nickel-alumina samples prepared by solvent impregnation are within the 400-600 m$^2$/g range, which is a high surface area range for the material. Additionally, alumina aerogels prepared using methanol have surface areas towards the top of the 600-800 m$^2$/g range.

Figure 5:
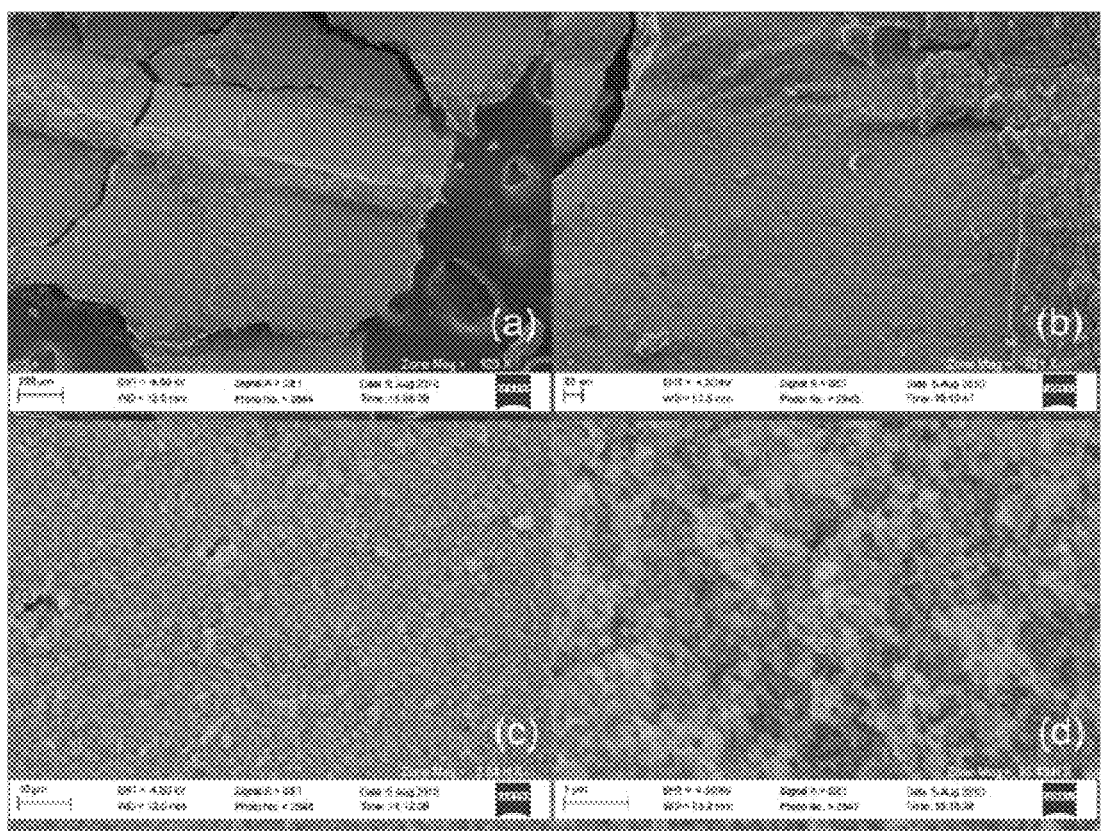
FIG. 5 is a collection of four SEM images of silica-coated cordierite presented at increasing magnifications from a) to d)
Figure 6:
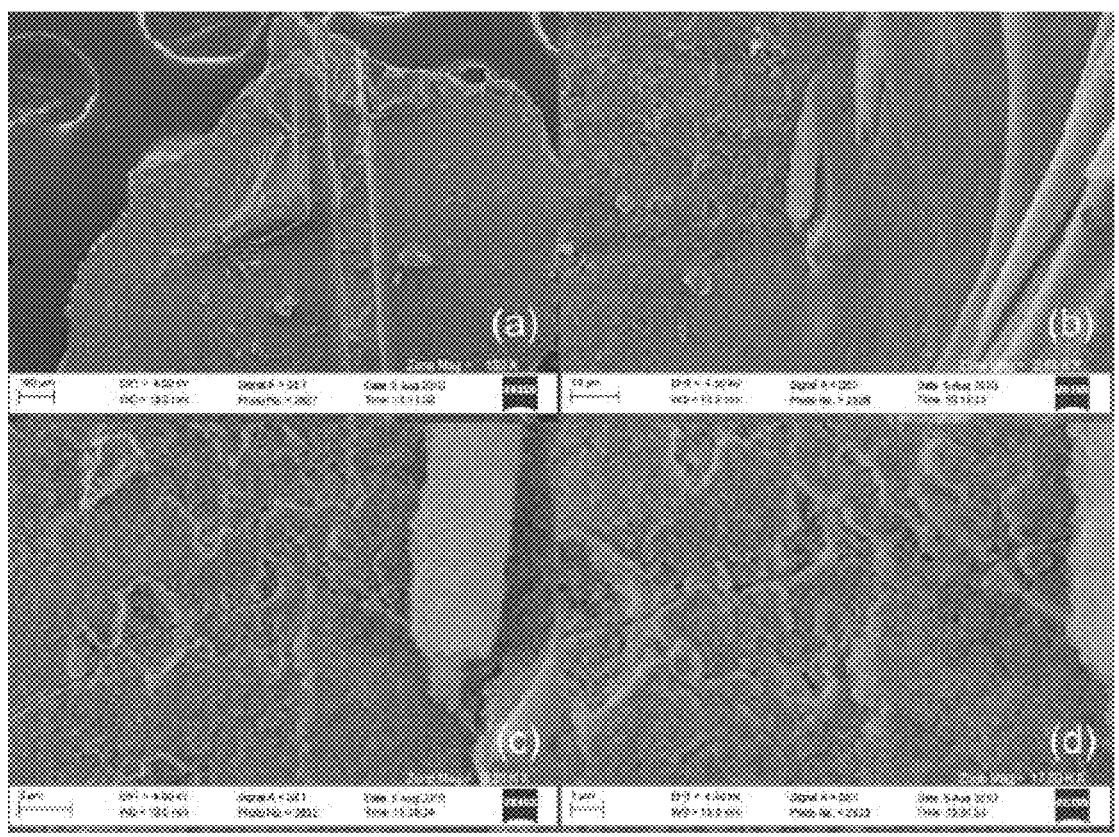
FIG. 6 is a collection of four SEM images of alumina-coated cordierite presented at increasing magnifications from a) to d)
Figure 7:
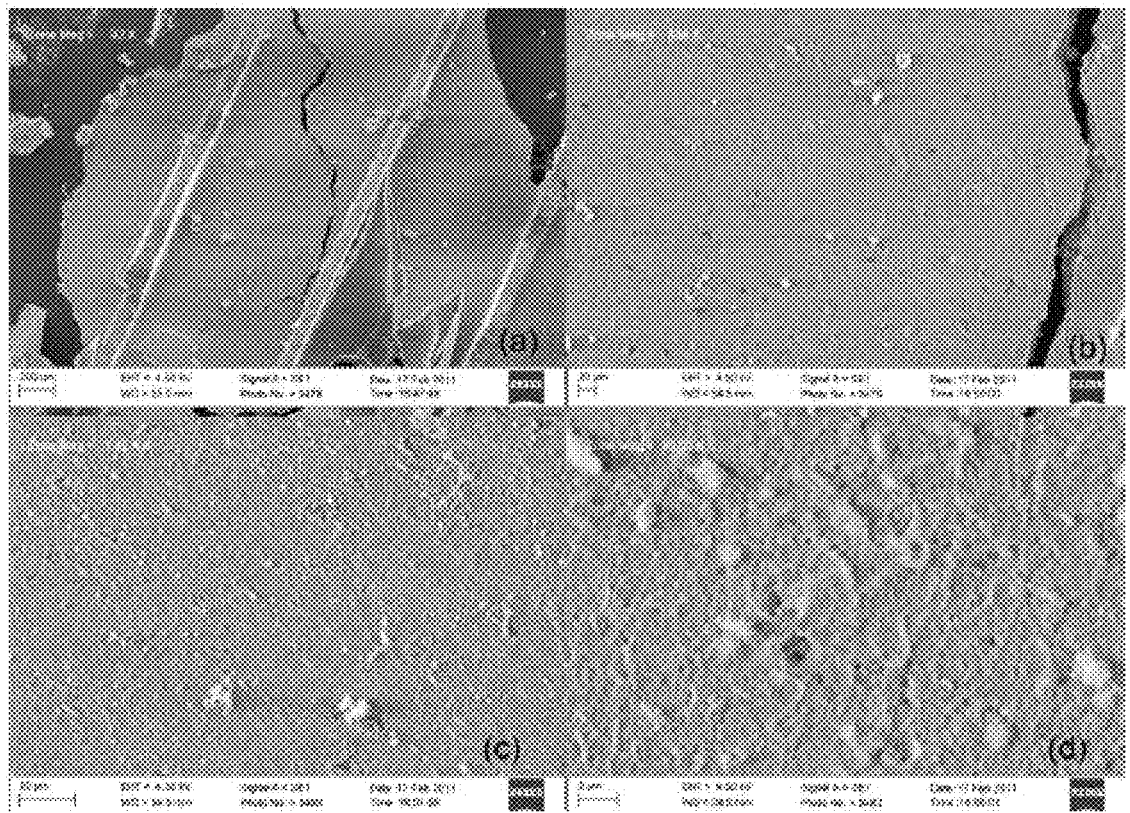
FIG. 7 is a collection of four SEM images of nickel-alumina-coated cordierite incorporating nickel through direct addition presented at increasing magnifications from a) to d).

In order to make the aerogel material resistant to gas flow conditions in an exhaust line a coating of aerogel material can be applied to a cordierite ceramic honeycomb. Cordierite is currently used as a support for the conventional heavy metal catalysts in catalytic converters. Binding aerogels to cordierite enables their catalytic properties to be used in catalytic converters. As seen in FIGS. 5-7, SEM images of cordierite samples show successful coating of the surface of a cordierite ceramic with several types of aerogel material, such as, silica, alumina and nickel-alumina.

The working conditions found in the conventional three-way catalyst catalytic converter can be simulated in accordance with the following procedures. Simulated exhaust gas is heated up to ~500° C. and passed through a reactor where the aerogel lies. The emissions prior to passing the aerogel and after passing the aerogel are measured using a five-gas analyzer and compared to determine the catalytic abilities of the aerogel. The simulated emissions gas, BAR 97 LOW, emission 32 blend, commonly used to calibrate gas analyzers, is mixed with compressed air at a 0.017:1 air to blend ratio to simulate stoichiometric combustion. The composition of the emissions blend is known to be: 203 ppm HC, 0.51% CO, 6% $CO_2$, and 301 ppm NO. At a 0.017:1 ratio the concentrations are: 199.6 ppm HC, 0.502% CO, 5.90% $CO_2$, and 295.9 ppm NO. To heat up the simulated exhaust to the desired temperature of 500° C. a preheating subsystem is used. Compressed air flows through a rotameter where its flow rate can be controlled, then it goes through an inline heater, and then through the reactor section, which is surrounded by heating tapes. Thermocouples are placed before and after the reactor to measure the temperature of the gas. Once the air reaches the desired temperature the emissions blend valve is opened. The emissions blend and compressed air flow through different rotameters and are mixed at the appropriate flow rates to achieve the desired air to emissions blend ratio. The mix then flows through a tube where the five-gas analyzer probe is set and the emissions are recorded. Then a three-way valve is switched so that the mix flows through the reactor where the aerogel lies. The simulated exhaust gas flows through the aerogel and then through the exhaust pipe where the five-gas analyzer probe is set. The five-gas analyzer records the emissions. The emissions prior to and after the mix goes through the aerogel can be compared to determine the effectiveness of the aerogel.

The test bed is constructed to simulate actual catalytic converter operation conditions. The most common temperature range of exhaust gas is 400 to 600° C., and the space velocity through a regular three way catalyst in normal operating conditions is between 5 and 30 $s^{-1}$. For this reason tests are typically run at 500° C., unless the purpose of the test is to prove the catalytic effectiveness as a function of temperature. To calculate the flow rate that would yield a space velocity through the reactor between 5 and 30 $s^{-1}$, ideal gas relations are used $$\frac{V_2}{V_1} = \frac{T_2}{T_1} \quad (1)$$

where $T_1$ is the room temperature (20° C. or 293K), $V_1$ is the volume flow rate at room temperature, $T_2$ is the temperature at which the test will be run (500° C. or 773K), and $V_2$ is the volume flow rate at the test temperature. Solving for $V_1$, equation (1) becomes:

$$V_1 = V_2 \left(\frac{T_1}{T_2}\right) \quad (2)$$

$V_2$ is equal to the volume of the reactor times the space velocity desired, $$V_2 = \upsilon V_r \quad (3)$$

where $\upsilon$ is the space velocity through the reactor and $V_r$ is the volume of the reactor (e.g. 15.2 mL). For a space velocity of 5 $s^{-1}$, solving for $V_1$ yields $$V_1 = 5s^{-1} * 15.2 \text{ mL} * \left(\frac{293K}{773K}\right) \quad (4)$$

$$= 29.376 \text{ mL/s}$$

$$= 1763 \text{ mL/min}$$

For a space velocity of 30 $s^{-1}$ the volume flow rate required is:

$$V_1 = 30 \text{ s}^{-1} * 15.2 \text{ mL} * \left(\frac{293K}{773K}\right)$$

$$= 172.84 \text{ mL/s}$$

$$= 10370 \text{ mL/min}$$

Considering the suction rate of the five-gas analyzer, which is approximately 3 mL/min, a volume flow rate of 6160 mL/min is chosen to ensure that the only input going through the five gas analyzer is the emissions mix. At a 0.017:1 air to emissions blend ratio (used to simulate stoichiometric combustion), the volume flow of gas required is 6057 mL/min and the volume flow of air required is 103 mL/min. This results in a space velocity through the reactor of 18 $s^{-1}$ at 500° C.

The catalytic abilities of different non-PGM containing aerogel catalysts prepared in accordance with the present invention were shown in tests using simulated exhaust gas at typical catalytic converter working conditions to confirm their suitability as a replacements for conventional precious metal three-way catalysts. The present aerogels reduce cost and environmental impact associated with the production of catalytic converters. Nickel-alumina aerogels were produced which exhibited suitable physical properties and catalytic effectiveness for exhaust processing.

To confirm that the test bed is effective in simulating actual catalytic converter conditions the test was performed on a section of conventional catalytic converter material and the results compared to published values. Using the actual conventional catalytic converter substrate, conversion efficiencies of over 90% were obtained for CO, HC, and NO, which is consistent with typical published conversion efficiencies for conventional three-way catalysts. This demonstrated that the test bed is effective in simulating actual operating conditions, providing a good setup to perform aerogel testing. A nickel-alumina aerogel prepared in accordance with the present invention placed in the reactor as a powder and simulated exhaust, composed of 199.6 ppm propane, 0.5014% CO, 5.9% $CO_2$, 296 ppm NO, 0.35% $O_2$, and 93.18% $N_2$, ran through the test bed at 500° C., flowing at a space velocity of 18 $s^{-1}$ resulted in a 22% decrease in HC emissions, a 56% decrease in CO emissions and a 5% decrease in NO emissions. The same catalyst exposed to the same simulated exhaust at 550° C. flowing at a space velocity of 19 $s^{-1}$ resulted in almost 80% CO conversion, over 50% HC conversion, and NO conversion of almost 10%. This data confirmed the capabilities of the non-PGM containing catalyst of the present invention to remediate exhaust components generated from the combustion of hydrocarbon fuel.

The performance of the non-PGM containing aerogel catalyst of the present invention can be tailored to meet the specific regulatory, design, and economic requirements associated with particular applications. The adjustable design parameters of the aerogel catalyst that can be engineered and optimized to meet the requirements of a given application include but are not limited to: the specific chemistry of the non-PGM containing aerogel catalyst (e.g., the ratios of particular active species and additives can be optimized), the physical properties of the catalytic aerogel (e.g., the surface area, porosity, etc. can be optimized), the quantity or loading density of the catalyst, the residence time of the pollutant in the catalyst, the method of support of the catalyst, and the bulk flow pattern of the exhaust through the catalyst. Since the non-PGM containing aerogel catalysts have demonstrated activity for reactions key to a functional three-way catalyst (oxidation of CO and UHCs and reduction of $NO_x$) the overall (tailpipe output) performance can be optimized to meet specific requirements. Thus, for example the space velocity (inverse of the residence time) could be decreased in the catalytic converter employing a non-PGM containing aerogel catalyst in order to increase the overall percentage of pollutants removed from an exhaust stream passing through the converter to meet a particular application or regulatory requirements.

EXAMPLES

The invention will be further illustrated with reference to the following specific examples. It is understood that these examples are given by way of illustration and are not meant to limit the disclosure or the claims to follow.

In the preparation of aerogels for three-way catalysis applications several different recipes have been employed to make alumina, titania, titania-silica, nickel oxide, nickel-alumina, and copper-alumina aerogels by UCRSCE. A recipe for nickel-alumina aerogels using a single nickel impregnation solvent exchange and two additional absolute ethanol solvent exchanges results in a non-PGM containing aerogel catalyst having effective and reproducible three-way catalytic properties.

Example 1

Nickel-Alumina Aerogels

Materials. Aluminum chloride hexahydrate was procured from Fluka and used without further purification. Propylene oxide (99%) and nickel (II) nitrate hexahydrate were obtained from Sigma-Aldrich and used without further purification. Ethanol was acquired from Pharmco-AAPER (absolute ethanol) or Fisher Scientific (95% solvent grade) and used without further purification.

Preparation of Nickel-Alumina Sol Gels. First, a solution of 2.96 g (12.25 mmol) of $AlCl_3.6H_2O$ dissolved in 20 mL of 95% ethanol was made. Next, 9.48 mL of propylene oxide was added while stirring, resulting in a alumina sol gel, which was allowed to sit for 24 hours. Then, a solvent exchange was performed by preparing a solution of 0.915 g (3.15 mmol) of $Ni(NO_3)_2.6H_2O$ dissolved in 20 mL of absolute ethanol. The excess solvent was decanted from the alumina sol gel, and the nickel nitrate solution was poured into the sol gel beaker. The sol gel was set aside for another 24 hours, after which the sol gel assumed the candy green color of the solvent, leaving the solvent mostly devoid of color. Two subsequent solvent exchanges were performed, using only 20 mL of absolute ethanol to eliminate impurities by allowing the sol gel to sit in each solvent exchange for 24 hours.

Preparation of Nickel-Alumina Aerogels. After the solvent exchanges, the sol gel pieces were placed into a 12.6 by 12.6 by 1.8 cm (length by width by height) stainless steel mold with 4 circular wells measuring 3.8 cm in diameter and 1.5 cm in depth. Each well was filled with absolute ethanol and the mold was covered with a 12.6 cm square piece of stainless steel foil and a 12.6 cm square piece of 1/32" thick sheet of graphite. The mold was then placed between the platens of the hot press and processed by UCRSCE using the conditions listed in Table 1 below.

Physical Characterization of Aerogels. Each aerogel was characterized by Fourier transform infrared spectroscopy (FTIR) with a Mattson Galaxy 6020 FTIR Spectrophotometer, crude bulk density measurements, helium pycnometry by a Micromeritics AccuPyc 2020 gas pycnometer, BET surface area and BJH pore size distribution analysis on an ASAP 2010 porosimeter, scanning electron microscopy (SEM) with a Zeiss EV050 Scanning Electron Microscope, and energy-dispersive x-ray spectroscopy (EDX) by a Bruker Quantax 200 EDX system with a Peltier-cooled XFlash silicon drift detector attachment.

Catalytic Characterization of Aerogels. Aerogel samples were analyzed for catalytic activity using a catalytic converter test bed. The test bed flows a 1:0.017 volume ratio mixture at a flow rate of 6160 mL/min of an emissions blend (BAR97 emissions 32 blend) and compressed air through the sample at 500° C. while using a five-gas analyzer to determine the concentration of each product gas. The emissions blend contains approximately 100 ppm $C_3H_8$, 0.5% CO, 6.0% $CO_2$, and 300 ppm $NO_x$. Emissions blend gas concentrations were also analyzed immediately before each test was performed.

Figure 2:
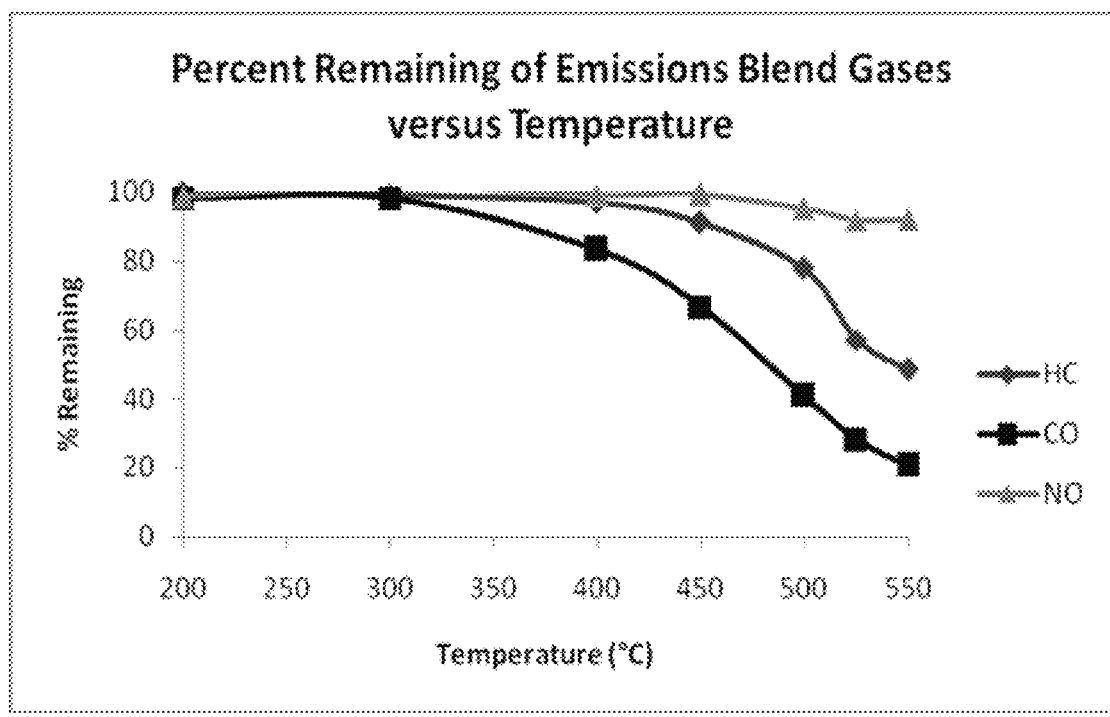
FIG. 2 is a graph of the percent of emissions of blend gases remaining verses temperature for catalysis by aerogel recipe NImp1-2E.

Results: Nickel-alumina aerogel samples were characterized using crude bulk density measurements, helium pycnometry, and BET surface area and BJH pore size distribution analysis. The results of these analyses are shown in Table 2. Infrared spectra were taken of each nickel-alumina sample. SEM images on the 100 μm, 10 μm, 2 μm, and 1 μm scales were taken to characterize the textural properties of the aerogels, and representative images are shown in FIG. 1. EDX mapping was utilized to determine the elemental dispersion across the aerogel surface. EDX spectra and map of a nickel-alumina aerogel show that the nickel, aluminum and oxygen atoms are co-located throughout the material. The catalytic test bed was used to screen the catalytic activity of nickel-alumina aerogel recipe, NImp1-2E at 500° C. The results of these tests are shown in Table 3. The catalytic test bed was used to screen the temperature dependence of the catalytic activity of nickel-alumina aerogel recipe, NImp1-2E from 200° C. to 550° C. The results of these tests are shown in FIG. 2.

Discussion: Nickel-alumina UCRSCE aerogels are capable of catalyzing reactions to reduce the concentrations of hydrocarbons, carbon monoxide, and nitric oxides, as evidenced by the data shown in Table 3 and FIG. 2. In addition, the catalytic ability of nickel-alumina aerogels is temperature-dependent, with a "light-off" temperature of about 500° C. This catalytic activation may be caused by oxidation of the nickel in the sample, resulting in a noticeable color change. This activation may be accompanied by sintering or rearrangement of the nickel-alumina crystalline structure. Nickel-alumina aerogels were also prepared using a direct addition method followed by UCRSCE processing as described for copper-alumina aerogels in Example 2 below.

TABLE 1

UCRSCE processing conditions for Nickel-Alumina and Copper-Alumina Aerogels

| Step | Temperature (° F.) | Temp rate (°/min) | Force (kips) | Force rate (kip/min) | Dwell time |
|---|---|---|---|---|---|
| 1 | 90 | 200 | 45 | 200 | 2 min |
| 2 | 480 | 4 | 45 | 200 | 30 min |
| 3 | 480 | 200 | 1 | 1 | 30 min |
| 4 | 90 | 2 | 1 | 200 | 30 sec |
| 5 | end | | | | |

TABLE 2

Characterization of Nickel-Alumina Aerogels

| Aerogel | Sample | Crude Bulk Density (g/cm³) | Skeletal Density (g/cm³) | Surface Area (m²/g) | Average Pore Diameter (nm) |
|---|---|---|---|---|---|
| Ni—Al | NImp1-2EN | 0.09 ± 0.01 | 2.50 ± 0.05 | 350 ± 10 | 17 ± 2 |
| | NImpR1-2EN | 0.14 ± 0.02 | 2.43 ± 0.03 | 380 ± 10 | 27 ± 2 |
| | NImp1-2E | 0.066 ± 0.009 | 2.23 ± 0.07 | 610 ± 20 | 25 ± 2 |
| | NImp1-2E-2 | 0.06 ± 0.01 | 2.26 ± 0.06 | 640 ± 30 | 23 ± 2 |
| | NImp1-2E-3 | 0.065 ± 0.007 | 2.34 ± 0.07 | 590 ± 20 | 29 ± 2 |
| | 2NImp1-2E-4 | 0.068 ± 0.008 | 2.32 ± 0.06 | 610 ± 20 | 28 ± 2 |
| | NImp1-3/3EN | 0.054 ± 0.006 | 2.36 ± 0.07 | 640 ± 30 | 28 ± 2 |

Key:
NImp1 = Nickel Impregnation Recipe,
NImpR1 = One-day Aerogel Production Process;
2E = 2 additional absolute ethanol solvent exchanges,
2EN = 2 additional 0.915 g nickel impregnated solvent exchanges,
3/3EN = 3 total 0.305 g nickel impregnated solvent exchanges;
final number indicates batch number.

TABLE 3

Percent remaining of each emissions gas component for flow at a space velocity of 18 s$^{-1}$ and temperature of 500° C. for 5 repeated tests.

| | No | Ni—Al Aerogel | | | | |
|---|---|---|---|---|---|---|
| Component | Aerogel | Test 1 | Test 2 | Test 3 | Test 4 | Test 5 |
| HC (ppm) | 100% | 80% | 85% | 77% | 81% | 74% |
| CO (%) | 100% | 50% | 56% | 44% | 42% | 42% |
| NO (ppm) | 100% | 95% | 95% | 94% | 93% | 90% |

Example 2

Copper-Alumina Aerogels

Precursor Recipe: First, 2.26 g of $AlCl_3 \cdot 6H_2O$ (>99%, Fisher) and 0.70 g of $Cu(NO_3)_2 \cdot 3H_2O$ (99%, Acros Organics) was dissolved in 20 mL of solvent-grade ethanol (Fisher). The mixture was stirred until no particulates were visible. Once the precursor salts had dissolved, 9.48 mL of propylene oxide was added to the mixture with stirring. Gelation occurred in fewer than 3 min after the addition of the propylene oxide. The sol gel was allowed to set overnight before undergoing a solvent rinse with ethanol.

Preparation of Copper-Alumina Aerogels. After the solvent exchanges, the sol gel pieces were placed into a 12.6 by 12.6 by 1.8 cm (length by width by height) stainless steel mold with 4 circular wells measuring 3.8 cm in diameter and 1.5 cm in depth. Each well was filled with absolute ethanol and the mold was covered with a 12.6 cm square piece of stainless steel foil and a 12.6 cm square piece of 1/32" thick sheet of graphite. The mold was then placed between the platens of the hot press and processed by UCRSCE using the conditions listed in Table 1, above.

Physical Characterization of Aerogels. The copper-alumina aerogels were characterized by crude bulk density measurements, helium pycnometry by a Micromeritics AccuPyc 2020 gas pycnometer, scanning electron microscopy (SEM) with a Zeiss EV050 Scanning Electron Microscope, and energy-dispersive x-ray spectroscopy (EDX) by a Bruker Quantax 200 EDX system with a Peltier-cooled XFlash silicon drift detector attachment.

Results: After processing the copper-alumina aerogel had crude bulk density of 0.13±0.2 g/cm³ and skeletal density 3.06 g/cm³. EDX spectra and map of the copper-alumina aerogel show that the copper, aluminum and oxygen atoms are co-located throughout the aerogel material. This example describes copper-alumina aerogels prepared via a direct addition recipe. Copper-alumina aerogels were also prepared using an impregnation recipe followed by UCRSCE processing, as described for Ni—Al aerogels in Example 1, above.

Example 3

Nickel Oxide Aerogel

Precursor Recipe: A nickel(II) oxide aerogel was prepared using nickel(II) chloride hexahydrate (Fisher, certified), absolute ethanol (Pharmco-AAPER) and propylene oxide (99%, Sigma-Aldrich). To a solution of 0.74 g of $NiCl_2 \cdot 6H_2O$ dissolved in 5.0 mL of absolute ethanol, 2.4 mL of propylene oxide was added. This solution was sonicated until a light green gel had formed (about 10 min) and then allowed to rest for 24 hours. Excess solvent was then carefully removed by decanting and 5.0 mL of fresh absolute ethanol was added to the gel. After an additional 24 hours, the excess solvent was decanted and the gel was processed via UCRSCE.

Preparation of Nickel Oxide Aerogels. After the solvent exchanges, the sol gel pieces were placed into a 12.6 by 12.6 by 1.8 cm (length by width by height) stainless steel mold with 4 circular wells measuring 3.8 cm in diameter and 1.5 cm in depth. Each well was filled with absolute ethanol and the mold was covered with a 12.6 cm square piece of stainless steel foil and a 12.6 cm square piece of 1/32" thick sheet of graphite. The mold was then placed between the platens of the hot press and processed by UCRSCE using the conditions listed in Table 4 below.

TABLE 4

UCRSCE processing conditions for Nickel Oxide Aerogels

| Step | Temperature (° F.) | Rate (° F./min) | Restraining Force (kips) | Rate (kips/min) | Holding Time (min) |
|---|---|---|---|---|---|
| 1 | 90 | 500 | 45 | 600 | 1 |
| 2 | 480 | 4 | 45 | 1 | 30 |
| 3 | 480 | 200 | 1 | 1 | 15 |
| 4 | 100 | 4 | 1 | 600 | 1 |
| 5 | | | OFF | | |

Physical Characterization of Aerogels. The nickel oxide aerogels were characterized by helium pycnometry by a Micromeritics AccuPyc 2020 gas pycnometer, and BET surface area and BJH pore size distribution analysis on an ASAP 2010 porosimeter.

Results: After processing the nickel (II) oxide aerogel was a yellow-green powder with skeletal density 3.33±0.09 g/cm$^3$, BET Surface Area=125±4 m$^2$/g, BJH Cumulative Pore Volume=0.463514 cm$^3$/g and BJH Average Pore Diameter=13±2 nm.

Example 4

Preparation of Titania and Titania-Silica Aerogels

Materials: Titania aerogels were prepared using titanium (IV) butoxide (TIB, Sigma-Aldrich, reagent grade 97%), reagent grade methanol (Fisher Scientific), a stock solution of nitric acid and lab deionized water. Two methods were employed for making titania-silica aerogels. Method 1 involved an impregnation technique using tetramethylorthosilicate (TMOS, Aldrich, 98%), deionized water, reagent grade methanol (Fisher Scientific), a stock solution of 1.5 M ammonia as catalyst, titanium isopropoxide (TIP, 97%+) from Alfa Aesar and acetylacetone (AA, 99%) also from Alfa Aesar. Method 2 involved a co-precursor method using TIP, tetraethylorthosilicate (TEOS, ≥99%) from Aldrich, reagent grade ethanol (Fisher Scientific), lab deionized water and stock solutions of 0.363 M hydrochloride (HCl) and 0.5 M ammonia (NH$_3$). All reagents and solvents were used without further purification. Precursor chemicals were pipetted into beakers and stirred either by hand or using a magnetic stirrer (Fisher Scientific).

Processing Equipment: Aerogels were fabricated via the UCRSCE process using a 24-ton hydraulic hot press from Tetrahedron Associates and two types of molds. One was a single-well mold instrumented with a pressure/temperature sensor, fabricated from cold-rolled steel with outer dimensions of 70×76×25 mm high. The well was cylindrical in shape with a diameter of 32 mm and depth of 19 mm. To process more aerogel material at a time we also used a 9-hole mold with outer dimensions 127×127 by 18.7 mm high, with each hole having a diameter of 22 mm and height of 18.7 mm. During processing the mold was sealed using gasket material that consisted of 0.025 mm thick stainless steel foil and 0.8 mm thick graphite sheets.

Aerogel Fabrication: Three types of aerogels were made: titiania, titania-silica-1 (impregnation) and titania-silica-2 (co-precursor). The details of each recipe are described below with further information in Tables 5-7.

Titania Recipe: This precursor recipe combines methanol, titanium (IV) butoxide, water and nitric acid. The chemicals were mixed together using the quantities shown in Table 5. 40 mL of methanol was mixed with the TIB and sonicated for 5 min. The remaining 10 mL of methanol was then mixed with the HNO$_3$ and sonicated for 5 min. The two mixtures were then combined and sonicated for an additional 5 min. The titania aerogels were fabricated in the larger (127×127 mm) mold. The mold was placed between the platens of the hot press and poured in the precursor chemical mixture. The press was then closed and set to apply a 200 kN force to the mold/gasket assembly. After a 3 hour waiting period (to allow for gelation to occur), the temperature was set to increase at a rate of 2.2° C./min to 330° C. while maintaining the force at 200 kN. Once the system reached 330° C. this force was held for 30 min and then the press force was decreased at a rate of 4.4 kN/min to 4.4 kN. The supercritical fluids were vented from the mold as the force decreased. After another wait (15 min), cooling was set to bring the mold to 32° C. at a rate of 2.8° C./min.

TABLE 5

Details of the Titania recipe.

| Chemical | Quantity (mL) |
| --- | --- |
| Methanol (MeOH) | 50 |
| Titanium(IV) butoxide (Ti(OC$_4$H$_{12}$)$_4$) | 10.65 |
| Nitric acid (HNO$_3$) 1.5M aq. solution | 0.164 |
| Deionized water (H$_2$O) | 2.26 |

Titania-Silica Recipe 1 (Impregnation Method): This recipe involves the fabrication of a silica wet gel that is then impregnated with titania before processing. The silica wet gel is made from a TMOS-based recipe as shown in Table 6. TMOS, water, methanol, and ammonia were combined together and stirred manually in a beaker for 5 min. The beaker was then covered with parafilm, and left for 24 hours during which time it gelled. On the second day, the parafilm was loosened to allow some shrinkage of the wet gel before removing the gel from the beaker for the subsequent steps. On the third day the silica wet gel was bathed in excess isopropanol for at least 24 hours. Next, the wet gel was bathed in a solution of titanium isopropoxide and acetylacetone with a molar ratio of 1:1 (TPAA solution) for 1-15 days. This was followed by one additional solvent exchange in excess isopropanol for 24 hours. These aerogels were fabricated in the smaller, single-well mold. The initial force was set to 66.7 kN to account for the smaller mold area. The gelation step was eliminated (as they were already gelled) and the mold was immediately heated to 300° C. at a rate of 4.4° C./min. Upon reaching 300° C. the mold was allowed to equilibrate for 1 hour after which time the force was lowered to 4.4 kN at a rate of 4.4 kN/min and the supercritical fluids were allowed to escape. The system was again allowed to equilibrate for 15 min and then cooled to 38° C. at a rate of 4.4° C./min.

TABLE 6

Details of the Titania-Silica Impregnation Method recipe.

| Chemical | Quantity (mL) |
| --- | --- |
| Silica Wet Gel | |
| Tetramethylorthosilicate (TMOS) | 7.44 |
| Deionized Water (H$_2$O) | 3.69 |
| Methanol (MeOH) | 14.58 |
| Ammonia (NH$_3$) 1.5M aq. solution | 0.33 |
| TPAA Solution | |
| Titanium isopropoxide (TIP) | 30 |
| Acetylacetone (AA) | 22 |
| Isopropanol | 7.5 |

Titania-Silica Recipe 2 (Co-Precursor Method): This recipe uses chemicals in the amounts shown in Table 7. First the TEOS was mixed with TIP by magnetic stirring for 5 minutes. Next, ethanol, water and HCl were added and the mixture was stirred for 15 minutes. This was followed by the addition of more reagents; water, ethanol and 1.5 M ammonia solution and additional stirring, followed by aging from 0 to 24 hours at room temperature. The TiSi-2 co-precursor gels were fabricated in the larger mold. The initial force was set to 214 kN and the mold was immediately heated to 300° C. at a rate of 1.7° C./min (this slower rate was used so that gelation could occur during heating). Upon reaching 300° C. the mold was allowed to equilibrate for 2 hours after which time the force was lowered to 4.4 kN at a rate of 4.4 kN/min and the supercritical fluids were allowed to escape. The system was again allowed to equilibrate for 30 min and then cooled to 32° C. at a rate of 2.8° C./min.

TABLE 7

Details of the Titania-Silica Co-Precursor Method recipe.

| Chemical | Quantity (mL) | Mass (g) |
|---|---|---|
| Step 1 | | |
| TEOS | 4.5 | 4.2 |
| TIP | 0.94 | 0.90 |
| Step 2 | | |
| EtOH | 29.91 | 23.6 |
| $H_2O$ | 0.97 | 1.45 |
| 0.363M HCl | 0.48 | 0.05 |
| Step 3 | | |
| $H_2O$ | 0.24 | 0.24 |
| EtOH | 2.66 | 2.1 |
| 1.5M $NH_3$ | 0.42 | 0.38 |

Characterization: Samples were characterized through measurement of bulk and skeletal density, gas adsorption for BET surface area and BJH pore distribution, FTIR and SEM. To obtain measurements of the bulk density each sample was massed and the volume was estimated using digital image processing or calipers. Skeletal density measurements were performed on samples through the use of a Mircromeritics helium pycnometry system. BET surface area and BJH pore distribution were measured using an ASAP 2010 Gas Adsorption System (Micromeritics). SEM images of the samples were taken on a Zeiss EV050 Scanning Electron Microscope at varying magnifications. A Bruker Quantax 200 EDX system was used in conjunction with the SEM to gain energy dispersive x-ray (EDX) data.

Results: Titania aerogels were white, powdery and not monolithic. Titania-silica aerogels made using the impregnation method were monolithic and translucent with a yellow tint. The yellow tint is more pronounced for the aerogels that soaked longer in the TPAA solution. The titania-silica aerogels fabricated using the co-precursor method were typically monolithic, white, soft and flexible.

Figure 3:
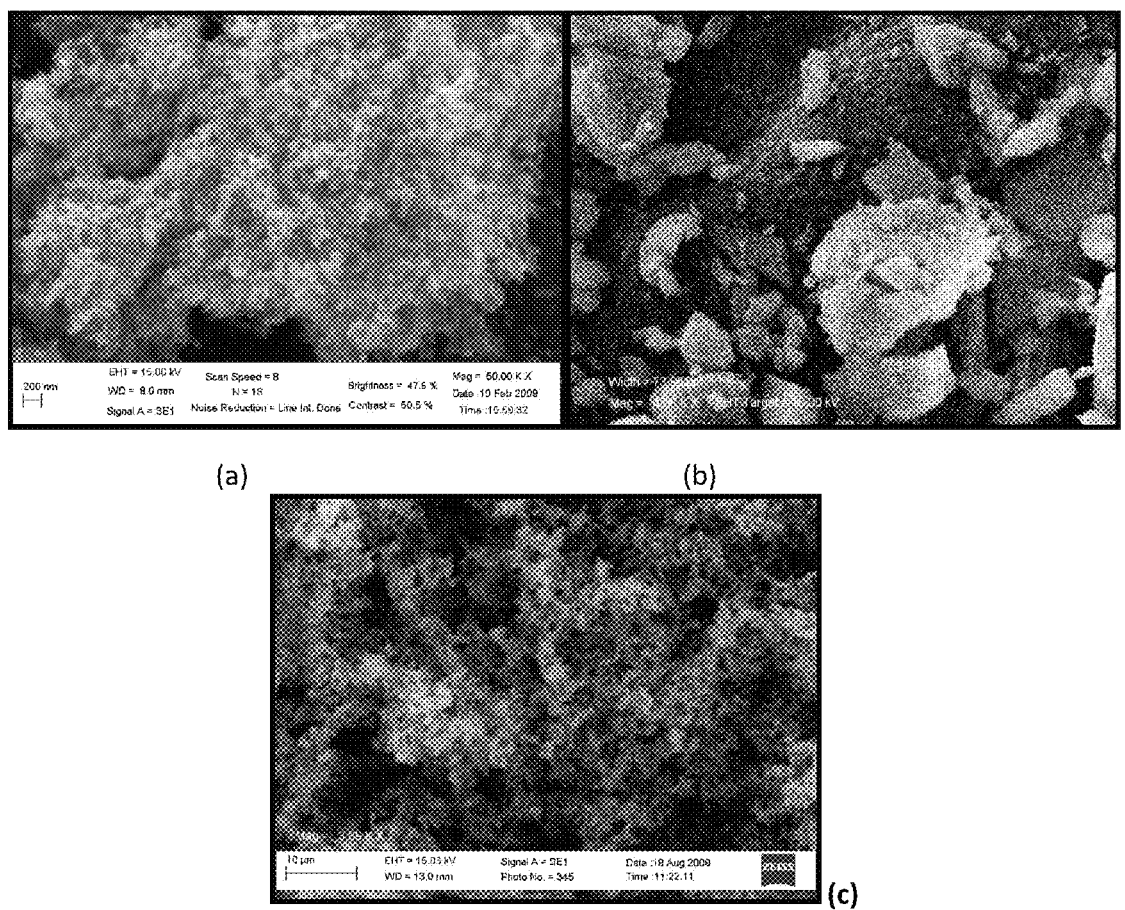
FIG. 3 is a collection of SEM images of (a) Titania (b) TiSi-1 (impregnation) and (c) TiSi-2 (co-precursor) aerogels.

FIG. 3 shows SEM results for the titania and titania-silica aerogels. While the titania aerogel SEM image clearly shows a nanoporous structure (200-nm scale), this is more difficult to see in the titania-silica aerogels, which are imaged at lower magnification due to difficulties imaging silica aerogels. There is little evidence of large pores at the micron scale in the TiSi-1 aerogels (they are expected to be seen at the 200-nm level). However, there is evidence of a porous structure at the micron scale in the TiSi-2 aerogels. Energy dispersive x-ray (EDX) imaging was used to investigate the composition of the TiSi-2 aerogels. Results showed evidence of Si, O and Ti in the aerogel with a fairly uniform dispersion of both Si and Ti throughout the sample.

The bulk density of the TiSi-2 aerogels is low (0.03 g/ml) whereas those made using the impregnation technique (TiSi-1) range from values of 0.14 g/mL (18-h soak) to 0.41 g/mL (5-day soak). The titania aerogels have skeletal densities of 3.6 g/mL. The TiSi-2 aerogel has the lowest skeletal densities (2.0 g/mL) while the TiSi-1 aerogels have skeletal densities of 2.3 g/mL. Skeletal density of TiSi aerogels appears to be independent of soak time in TPAA.

The $TiO_2$ aerogels had surface areas ranging from 127-188 $m^2/g$, which compares well with the characteristics of titania aerogel published in the literature. The TiSi-1 aerogels (18 hr) have surface areas ranging from 600-650 $m^2/g$. The TiSi aerogels with a 5-day soak time had a lower surface area (560 $m^2/g$). The TiSi-2 aerogels also exhibit good surface area (510-580 $m^2/g$). The titania aerogels exhibit low pore volumes (0.5 $cm^3/g$). The TiSi-1 aerogels have a much higher pore volume (2-2.6 $cm^3/g$) and the TiSi-2 aerogels have pore volumes ranging from 1.5-2.8 $cm^3/g$. Examination of the pore distributions reveals that the TiSi aerogels made using the impregnation method have relatively narrow pore distributions, with peak pore diameters in the 10-20 nm range. The $TiO_2$ aerogels have a broader pore distribution with most of the pores in the 20-100 nm range. The TiSi aerogels made using the co-precursor method have pore distributions that are between the two others, fairly broad with a peak at 25 nm.

The following preparation of aerogel coated substrates for three-way catalysis applications describes four methods for casting aerogel materials (silica, silica-titania, alumina and nickel-alumina) onto substrates (ceramic honeycomb, glass beads) using the UCRSCE method. The following examples confirm the ability to prepare non-PGM containing aerogel catalysts loaded on supports for use in automotive catalytic converters.

Example 5

Silica Aerogel on Cordierite

Precursor Recipe: The silica aerogels were made with a tetramethylorthosilicate (TMOS) based recipe. TMOS:methanol:water:ammonia in a molar ratio of 1:12:4:7.4×10$^{-3}$ was prepared. The TMOS was acquired from Sigma Aldrich at 98+% purity. Reagent-grade methanol, acquired from Fisher Scientific, and laboratory quality de-ionized water were used without further treatment. The 1.5 M ammonia catalyst was prepared by dilution of concentrated ammonia (Fisher Scientific, Reagent A.C.S. grade) with deionized water. A 40 mL batch of the precursor mixture was prepared by mixing 8.5 mL of TMOS, 27.5 mL of methanol, 3.6 mL of water and 0.13 mL of 1.5 M ammonia. The precursors were combined and mixed in a beaker.

UCRSCE Processing: The material was processed using a stainless steel mold which measured 12.6×12.6×1.8 cm (length by width by height), and had four circular wells measuring 3.8 cm in diameter and 1.5 cm in depth. Two different methods for preparing cordierite coated samples were used.

(a) A 2.5 mm diameter by 1.2 mm high cordierite honeycomb sample (900 cells/in$^2$) was placed in one of the wells. The precursor chemical was poured into the mold and then the cordierite material was submerged into the liquid.

(b) A 2.5 mm diameter by 1.2 mm high cordierite honeycomb sample (900 cells/in$^2$) was placed into the mold and then the precursor materials were poured directly over the cordierite piece.

The mold was then placed on a hydraulic hot press and sealed with a 12.6×12.6 cm $\frac{1}{32}$" thick piece of graphite and a thin sheet of stainless steel foil to prevent the graphite from sticking to the mold. The cordierite pieces were then processed using a six-hour UCRSCE technique in accordance with the conditions set forth in Table 8.

Figure 4:
FIG. 4 is a pair of images of aerogel on cordierite made using UCRSCE processing (L-R): silica aerogel resulting from cordierite placed in precursor solution and silica aerogel resulting from precursor solution poured onto cordierite.

Results: FIG. 4 shows the resulting pieces of cordierite. FIG. 5 shows SEM images of the silica aerogel on cordierite.

TABLE 8

UCRSCE processing conditions for cordierite coated with silica aerogel.

| Step | Temperature (° F.) | Temp rate (°/min) | Force (kips) | Force rate (kip/min) | Dwell time |
|---|---|---|---|---|---|
| 1 | 90 | 200 | 48 | 600 | 2 min |
| 2 | 550 | 3 | 48 | 10 | 30 min |
| 3 | 550 | 200 | 1 | 1 | 30 min |
| 4 | 90 | 3 | 1 | 600 | 30 sec |
| 5 | end | | | | |

Example 6

Alumina Aerogel on Cordierite

Precursor Recipe: 2.96 g of $AlCl_3.6H_2O$ was dissolved in 20 mL of ethanol, 9.48 mL of propylene oxide was added and the solution was stirred for 5-10 minutes. A piece of 1.5" diameter by 2" high cordierite honeycomb was submerged in the solution in the beaker. The solution gelled around the cordierite within seconds of its addition. These samples were then soaked in absolute ethanol in a beaker covered by parafilm overnight without agitation or stirring.

UCRSCE Processing: The material was processed using a stainless steel mold which measured 5.25"×5.25"×3" in (length by width by height), and had four circular wells measuring 1.5" diameter and 2.5" in depth. The gel covered cordierite sample was placed in one of the wells and the mold was then placed on the hydraulic hot press and sealed with the a 5.25"×5.25" graphite/stainless steel gasket. The processing conditions used are listed in Table 9 (below).

Results: SEM images (see FIG. 6) of the resulting material clearly show evidence of the aerogel material on the cordierite.

TABLE 9

UCRSCE processing conditions used for making cordierite coated with alumina and nickel-alumina aerogel.

| Step | Temperature (° F.) | Temp rate (°/min) | Force (kips) | Force rate (kip/min) | Dwell time |
|---|---|---|---|---|---|
| 1 | 90 | 200 | 38 | 600 | 2 min |
| 2 | 500 | 4 | 38 | 10 | 30 min |
| 3 | 500 | 200 | 1 | 1 | 30 min |
| 4 | 90 | 4 | 1 | 600 | 30 sec |
| 5 | end | | | | |

Example 7

Nickel-Alumina Aerogel Coated on Cordierite

Precursor Recipe: Nickel-alumina aerogels were prepared by dissolving 2.26 g of $AlCl_3.6H_2O$ and 0.843 g $Ni(NO_3)_2.6H_2O$ in 20 mL of ethanol, adding 9.48 mL of propylene oxide and stirring the solution for 5-10 minutes. A piece of 1.5" diameter by 2" high cordierite honeycomb was submerged in the solution in the beaker. The solution gelled around the cordierite within seconds of its addition, and the mixture was then allowed to sit overnight before supercritical extraction.

UCRSCE Processing: The material was processed in accordance with the procedure described above in Example 5 for the alumina aerogels.

Results: SEM images (see FIG. 7) of the resulting material clearly show evidence of the aerogel material on the cordierite support.

Example 8

Titania-Silica Aerogel on Glass Beads

Precursor Recipe: A titania-silica aerogel was prepared using titanium isopropoxide (TIP), tetraethyl orthosilicate (TEOS, Aldrich, ≥99%), ethanol, water, 0.363M hydrochloric acid, and 1.5 M ammonia catalyst. The molar ratio of TEOS:EtOH:$H_2O$:HCl:TIP is $0.02:0.51:0.08:0.274 \times 10^{-3}:0.0208$, respectively. Specific quantities for making 60 mL of precursor solution can be found in Table 10. The first step is to mix TEOS with TIP and stir for 15 min. Then ethanol, water and HCl are added (step 2 amounts) and the solution is stirred for an additional 15 minutes. Finally, more water and ethanol and the 1.5 M ammonia solution (step 3 amounts) are added and the solution is stirred for five more minutes.

TABLE 10

The quantities of chemicals used to make a titania-silica aerogel are set forth below.

| | Chemical | Quantity (mL) |
|---|---|---|
| Step 1 | TEOS | 9 |
| | TIP | 1.88 |
| Step 2 | EtOH | 59.82 |
| | $H_2O$ | 1.94 |
| | 0.363M HCl | 0.96 |
| Step 3 | water | 0.48 |
| | EtOH | 5.32 |
| | 1.5M $NH_3$ | 0.84 |

UCRSCE Processing: These aerogels were made using a 5" by 5" by 0.75" mold made of cold-rolled steel with nine wells, each of 075" deep with diameter 0.875". The mold was placed on the platens of a hydraulic hot press. Each well was filled with 4-6 mL of 0.5 mm diameter glass beads and these were then covered with the precursor solution. A 5" by 5" piece of kapton film and 1/32" graphite gasket was placed on top of the mold and the press was closed and set to operate at the processing conditions listed in Table 11 (below).

TABLE 11

UCRSCE processing conditions used for making glass beads coated with titania-silica aerogel.

| Step | Temperature (° F.) | Temp rate (°/min) | Force (kips) | Force rate (kip/min) | Dwell time |
|---|---|---|---|---|---|
| 1 | 90 | 200 | 48 | 600 | 2 min |
| 2 | 575 | 6 | 48 | 10 | 2 hr |
| 3 | 575 | 200 | 1 | 1 | 30 min |
| 4 | 90 | 5 | 1 | 600 | 30 sec |
| 5 | end | | | | |

Results: After processing the glass beads were covered with aerogel material with clear changes to the texture of the surface.

While the invention has been described with preferred embodiments, it is to be understood that variations and modifications are to be considered within the purview and the scope of the claims appended hereto.

What is claimed is:

1. A three-way catalyst which remediates hydrocarbon fuel combustion exhaust, comprising:
a non-platinum group metal (non-PGM) containing aerogel suitable for remediation of hydrocarbon fuel combustion exhaust having a surface area of from about 350 $m^2/g$ to about 640 $m^2/g$, wherein the non-PGM containing aerogel comprises a first metal component which catalyzes the oxidation of carbon monoxide and hydrocarbons and a second metal component different from the first metal component which catalyzes the reduction of nitrogen oxides present in the exhaust generated from the combustion of hydrocarbon fuel, wherein the catalyst comprises a silica or alumina-based aerogel cast onto a glass bead support using a Rapid Supercritical Extraction (RSCE) process.

2. A catalytic converter for remediation of hydrocarbon fuel combustion exhaust, comprising:
a housing having an exhaust inlet and an exhaust outlet,
a catalyst support disposed in the housing, and
a three-way catalyst suitable for remediation of hydrocarbon fuel combustion exhaust having a surface area of from about 350 $m^2/g$ to about 640 $m^2/g$ loaded onto the support, wherein the catalyst comprises a non-platinum group metal (non-PGM) containing aerogel comprising a first metal component which catalyzes the oxidation of carbon monoxide and hydrocarbons and a second metal component different from the first metal component which catalyzes the reduction of nitrogen oxides present in the exhaust generated from the combustion of hydrocarbon fuel entering the housing exhaust inlet, passing over the catalyst and exiting the housing exhaust outlet of the catalytic converter, wherein the three-way catalyst exhibits physical properties and catalytic effectiveness suitable as a replacement for a conventional precious metal three-way catalyst.

3. The catalytic converter of claim 2, wherein the first metal component and second metal component each comprise a Period 4 transition metal, Group 13 element, or Group 14 element from the Periodic Table of the Elements.

4. The catalytic converter of claim 2, wherein the first metal component comprises a combination of at least two different metal components.

5. The catalytic converter of claim 2, wherein the aerogel comprises a Period 4 transition metal, Group 13 element, or Group 14 element from the Periodic Table of the Elements incorporated into a backbone.

6. The catalytic converter of claim 5, wherein the backbone comprises silica, titania, or alumina.

7. The catalytic converter of claim 2, wherein the aerogel comprises a monolith, powder, particle, film, washcoat, or slurry form.

8. The catalytic converter of claim 2, wherein the aerogel is loaded on a support.

9. The catalytic converter of claim 8, wherein the support comprises a honeycomb, bead, plate, or foil.

10. The catalytic converter of claim 9, wherein the honeycomb comprises cordierite or metal; the bead comprise glass, metal, or polymer; or the foil or plate comprises metal.

11. The catalytic converter of claim 2, wherein the aerogel comprises nickel-alumina aerogel.

12. The catalytic converter of claim 11, wherein the aerogel is formed using the Union College Rapid Supercritical Extraction (UCRSCE) process.

13. The catalytic converter of claim 2, wherein the catalyst comprises a silica- or alumina-based aerogel cast onto a cordierite honeycomb support using a Rapid Supercritical Extraction (RSCE) process.

14. The catalytic converter of claim 2, wherein the catalyst comprises a silica- or alumina-based aerogel cast onto a cordierite honeycomb support using the Union College Rapid Supercritical Extraction (UCRSCE) process.

15. The catalytic converter of claim 2, wherein the catalyst comprises a silica- or alumina-based aerogel cast onto a glass bead support using a Rapid Supercritical Extraction (RSCE) process.

16. The catalytic converter of claim 2, wherein the catalyst is prepared by forming a sol-gel around a cordierite honeycomb and the aerogel is formed from the sol-gel using a Rapid Supercritical Extraction (RSCE) process.

17. The catalytic converter of claim 2, wherein the catalytic converter comprises a powder loaded onto a support.

18. The catalytic converter of claim 2, prepared by a Rapid Supercritical Extraction (RSCE) process.

19. The catalytic converter of claim 2, wherein the aerogel comprises a silica-based aerogel comprising Ti—Si, V—Si, Cr—Si, Mn—Si, Fe—Si, Co—Si, Ni—Si, Cu—Si, or Zn—Si.

20. The catalytic converter of claim 2, wherein the aerogel comprises an alumina-based aerogel comprising Ti—Al, V—Al, Cr—Al, Mn—Al, Fe—Al, Co—Al, Ni—Al, Cu—Al, or Zn—Al.

21. The catalytic converter of claim 2, wherein the aerogel comprises a titania-based aerogel comprising Cr—Ti, Mn—Ti, Fe—Ti, Co—Ti, Ni—Ti, Cu—Ti, or Zn—Ti.

22. The catalytic converter of claim 2, wherein the aerogel comprises V—Co—Al, V—Cu—Al, V—Co—Si, V—Cu—Si, V—Ti—Si, Cr—Ti—Si, Ni—Ti—Si. Cr—Cu—Al, Cr—Co—Al, or V—Ni—Al.

* * * * *